May 19, 1959
J. CURVA
2,887,679
MOTOR VEHICLE SPEED INDICATOR
Filed Oct. 5, 1956
2 Sheets-Sheet 1
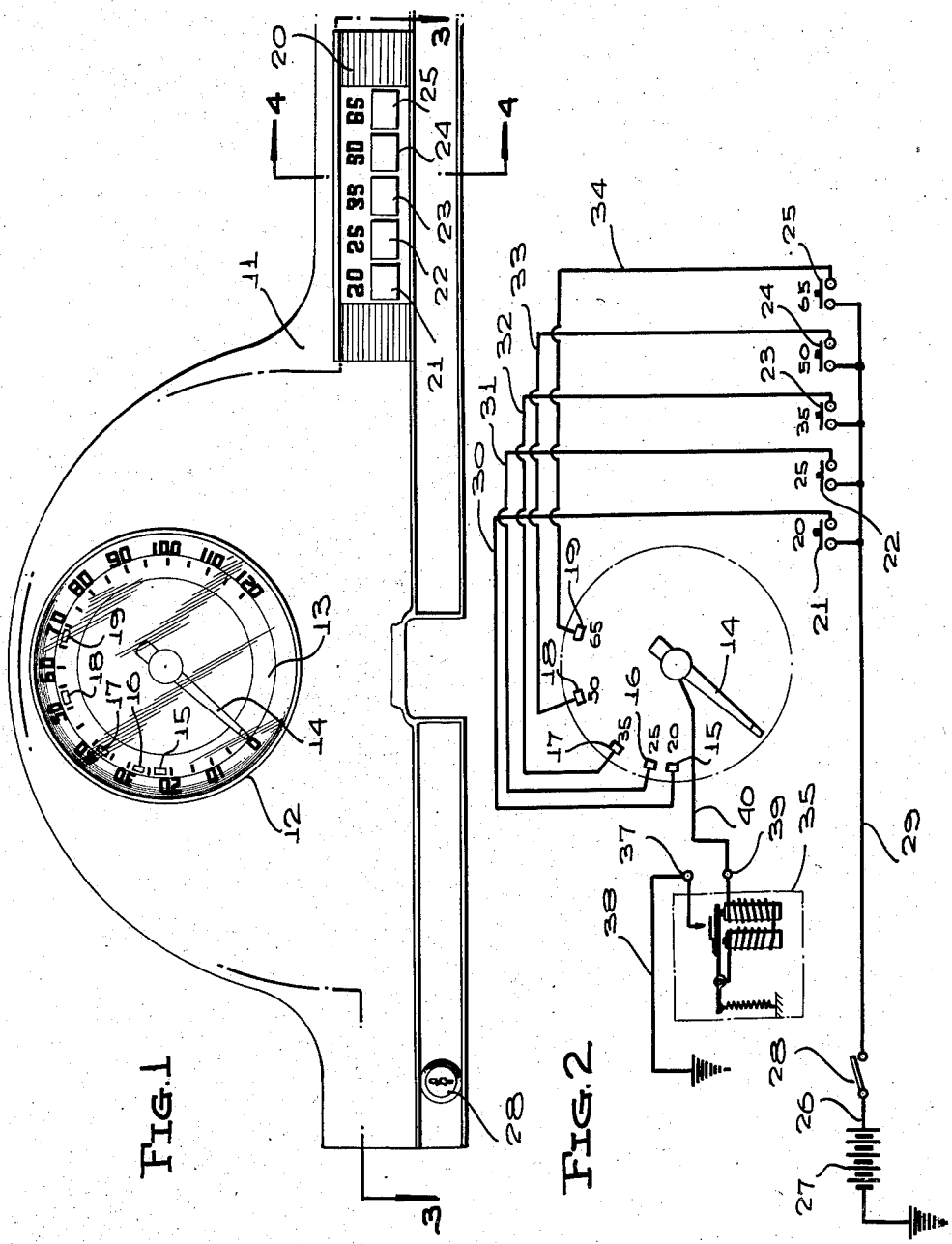
INVENTOR.
JAMES CURVA
BY
McMorrow, Berman & Davidson
ATTORNEYS May 19, 1959

J. CURVA 2,887,679

MOTOR VEHICLE SPEED INDICATOR

Filed Oct. 5, 1956

INVENTOR.
JAMES CURVA

BY
McMorrow, Berman & Davidson
ATTORNEYS

United States Patent Office 2,887,679
Patented May 19, 1959

2,887,679

MOTOR VEHICLE SPEED INDICATOR

James Curva, Cleveland Heights, Ohio

Application October 5, 1956, Serial No. 614,203

1 Claim. (Cl. 340—264)

This invention relates to motor vehicle speed warning devices, and more particularly to a motor vehicle speed warning system wherein a signal is given automatically when the vehicle speed reaches one of a number of different speeds which may be preselected by the vehicle operator.

A main object of the invention is to provide a novel and improved motor vehicle speed warning system which involves simple components, which is easy to install, and which is arranged so that the vehicle operator may preselect a speed at which a warning is desired, in accordance with the legal speed limit of the zone in which the motor vehicle is traveling.

A further object of the invention is to provide an improved automatic motor vehicle speed warning device which involves inexpensive components, which is reliable in operation, and which operates concurrently with the speedometer of the motor vehicle to automatically establish an energizing circuit for a signal device when the speedometer needle reaches a preselected position on the speedometer dial corresponding to the limiting speed for the zone in which the motor vehicle is traveling.

Further objects and advantages of the invention will become apparent from the following description and claim, and from the accompanying drawings, wherein:

Figure 1 is a front elevational view of a portion of the dashboard of a motor vehicle equipped with a speedometer and with an automatic speed warning apparatus according to the present invention.

Figure 2 is a schematic wiring diagram illustrating the electrical connections of the speed warning apparatus shown in Figure 1.

Figure 3 is a horizontal cross sectional view taken on line 3—3 of Figure 1.

Figure 4 is an enlarged transverse vertical cross sectional view taken on line 4—4 of Figure 1.

Referring to the drawings, 11 designates a portion of the dashboard of a motor vehicle, said dashboard being provided with a speedometer 12 comprising a dial 13 and a conductive movable pointer 14 operated in a conventional manner by the speedometer cable of the motor vehicle and rotating around the dial 13 as the speed of the vehicle changes.

Mounted in the dial 13 in positions to be engaged by the pointer 14 as the pointer swings successively to the corresponding positions on the dial associated with different vehicle speeds are a series of contacts 15, 16, 17, 18 and 19 located adjacent the markings on the dial 13 corresponding respectively to twenty miles per hour, twenty-five miles per hour, thirty-five miles per hour, fifty miles per hour, and sixty-five miles per hour. As will be readily apparent, when the motor vehicle reaches the speeds above listed, the pointer 14 respectively engages contacts 15 to 19.

Designated generally at 20 is a push-button switch assembly which is mounted on the dashboard 11 laterally adjacent to the speedometer 12, as shown in Figure 1, the push-button switch assembly comprising respective push-button switch units 21, 22, 23, 24 and 25 arranged in a row, as shown in Figure 1. The front wall of the push-button switch assembly 20 is provided with markings above the respective push-button units 21 to 25, as illustrated, said markings comprising "20," "25," "35," "50," and "65," corresponding to the respective vehicle speeds associated with the contacts 15 to 19.

The push-button switch units 21 to 25 are conventional in construction and are of the type wherein the switches are closed by pressing the button elements thereof inwardly, said switches remaining closed until the button elements are again pressed.

The push-button switch assembly may be of any conventional type, for example, may be of the well known type wherein a selected push-button will operate one of the switch units and maintain the switch unit closed until another push-button is pressed, at which time the original switch unit is released and opened and the switch unit corresponding to the button last pressed is closed.

Referring now to Figure 2, it will be seen that the ungrounded wire 26 connected to the motor vehicle battery 27 is connected through the motor vehicle ignition switch 28 to a wire 29. The contact 15 is connected through a wire 30 and switch unit 21 to the wire 29. Contact 16 is connected to a wire 31 and switch unit 22 to the wire 29. Contact 17 is connected through a wire 32 and the switch unit 23 to the wire 29. Contact 18 is connected through a wire 33 and the switch unit 24 to the wire 29. Contact 19 is connected through a wire 34 and the switch unit 25 to wire 29. Thus, the respective contacts 15 to 19 are connected in series with the switches 21 to 25, respectively, to the wire 29. Designated at 35 is a buzzer assembly which is mounted on the supporting plate 36 associated with the row of switch units 21 to 25, as shown in Figure 3, the buzzer assembly 35 being located behind the panel 11 and between the speedometer 12 and the switch assembly 20, as shown in Figure 3. One terminal of the buzzer assembly 35, shown at 37 is connected to ground by a wire 38. The other terminal of the buzzer assembly, shown at 39, is connected by a wire 40 to the pointer 14 of speedometer 12.

As will be readily understood, the ignition switch 28 is closed when the vehicle is operating, and when a selected one of the switches 21 to 25 is closed, the buzzer 35 will be energized when the pointer 14 engages the contacts 15, 16, 17, 18 or 19 connected in series with the closed switch unit. Thus, assuming that the vehicle operator wishes to obtain a warning signal when the vehicle reaches a speed of twenty miles per hour, the operator presses the button 21, closing the switch unit. When the speedometer needle 14 engages the contact 15, namely, when the vehicle reaches a speed of twenty miles per hour, the buzzer 35 is energized through a circuit comprising ungrounded terminal 26 of battery 27, ignition switch 28, wire 29, switch unit 21, wire 30, contact 15, speedometer pointer 14, wire 40, the winding and contacts of the buzzer, the wire 38, and ground.

A similar warning indication will be provided if a different switch unit is closed, corresponding to a different motor vehicle speed at which the desired warning must be obtained.

While a specific embodiment of an improved motor vehicle speed warning system has been disclosed in the foregoing description, it will be understood that various modifications within the spirit of the invention may occur to those skilled in the art. Therefore it is intended that no limitations be placed on the invention except as defined by the scope of the appended claims.

What is claimed is:

A speed warning device for use on a vehicle having a dashboard in which a speedometer is mounted, said speedometer having a dial formed with indicia identifying progressive rates of speed which the vehicle can attain and having a conductive movable pointer adapted to respond, in its movements, to the speed of the vehicle and to indicate such speeds in cooperation with the dial and the indicia on the dial; said device comprising a plurality of fixed contacts spaced around the dial in alignment with the identifying indicia and adapted to be electrically engaged by the pointer, a supporting bar disposed rearwardly of the dashboard in spaced parallel relation therewith, bolt means connecting the bar to the dashboard so as to mount the bar behind the dashboard in a position adjacent to the speedometer, a plate fixed by the bolt means to the front of the dashboard and having a plurality of side-by-side openings passing therethrough, said dashboard having an opening aligned with said openings in the plate, said plate lying alongside the speedometer dial, each of said openings in the plate being identified by an indicia corresponding to one of the rates of speed indicated by the indicia on the speedometer dial, a plurality of switch units mounted on the bar in side-by-side fashion, each unit being in alignment with an opening in the plate, a push-button switch activator slidably mounted in each opening in the plate and connected to an associated switch unit for activating the associated switch unit, an audible signal means mounted on the bar intermediate the switch units and the speedometer dial, a source of current, and respective circuit means connecting said audible signal means, source of current, pointer, and the respective contacts and switches in series, whereby if a switch is closed, said signal means will be energized when the pointer engages the contact associated with the closed switch.

References Cited in the file of this patent
UNITED STATES PATENTS

| | | |
|---|---|---|
| 2,452,344 | Addorisio | Oct. 26, 1948 |
| 2,543,877 | Stein | Mar. 6, 1951 |